United States Patent
Jondu et al.

(10) Patent No.: US 10,726,698 B1
(45) Date of Patent: Jul. 28, 2020

(54) SYSTEMS AND METHODS FOR ESTABLISHING CUSTOMIZED PROTECTION AREAS

(71) Applicant: Ademco Inc., Golden Valley, MN (US)

(72) Inventors: Lokanatha Reddy Jondu, Bangalore (IN); Piyush Awadhesh, Bangalore (IN); Praveen Kumar, Thanjavur (IN)

(73) Assignee: ADEMCO INC., Golden Valley, MN (US)

( * ) Notice: Subject to any disclaimer, the term of this patent is extended or adjusted under 35 U.S.C. 154(b) by 0 days.

(21) Appl. No.: 16/404,242

(22) Filed: May 6, 2019

(51) Int. Cl.
G08B 1/08 (2006.01)
G08B 21/04 (2006.01)
H04W 4/021 (2018.01)
G08B 31/00 (2006.01)

(52) U.S. Cl.
CPC ......... *G08B 21/0423* (2013.01); *G08B 31/00* (2013.01); *H04W 4/021* (2013.01)

(58) Field of Classification Search
None
See application file for complete search history.

(56) References Cited

U.S. PATENT DOCUMENTS

| | | | |
|---|---|---|---|
| 7,113,099 B2 | 9/2006 | Tyroler et al. | |
| 7,164,354 B1 | 1/2007 | Panzer | |
| 8,325,025 B2 | 12/2012 | Morgan et al. | |
| 8,536,999 B2 | 9/2013 | Holcman et al. | |
| 9,280,902 B2 * | 3/2016 | Silzer, Sr. | G05D 1/0278 |
| 9,721,445 B2 | 8/2017 | Hatch | |
| 2004/0174264 A1 * | 9/2004 | Reisman | G07C 9/28 340/573.4 |
| 2018/0144605 A1 * | 5/2018 | Kusens | G08B 21/043 |

* cited by examiner

Primary Examiner — Adolf Dsouza
(74) Attorney, Agent, or Firm — Husch Blackwell LLP

(57) ABSTRACT

Systems and methods as provided herein can include receiving user input defining a protection area within a region monitored by a security system, identifying a physical entity associated with the security system, assigning the physical entity to the protection area, receiving movement data of the physical entity from a monitoring device, and using the movement data to identify a pattern of movement of the physical entity with respect to the protection area. Such systems and methods can also include continuing to receive the movement data from the monitoring device after identifying the pattern of movement, determining whether the movement data received after identifying the pattern of movement deviates from the pattern of movement, and when the movement data received after identifying the pattern of movement deviates from the pattern of movement, initiating an alert.

20 Claims, 2 Drawing Sheets

SYSTEMS AND METHODS FOR ESTABLISHING CUSTOMIZED PROTECTION AREAS

FIELD

The present invention relates to security systems. More particularly, the present invention relates to systems and methods for establishing customized protection areas monitored by a security system.

BACKGROUND

Known security systems monitor a preconfigured area and objects and people that are associated with the preconfigured area. However, such known security systems do not include systems and methods for establishing customized protection areas and associating specific objects and people with the customized protection areas.

In view of the above, there is a need and an opportunity for improved systems and methods.

DETAILED DESCRIPTION

Figure 1:
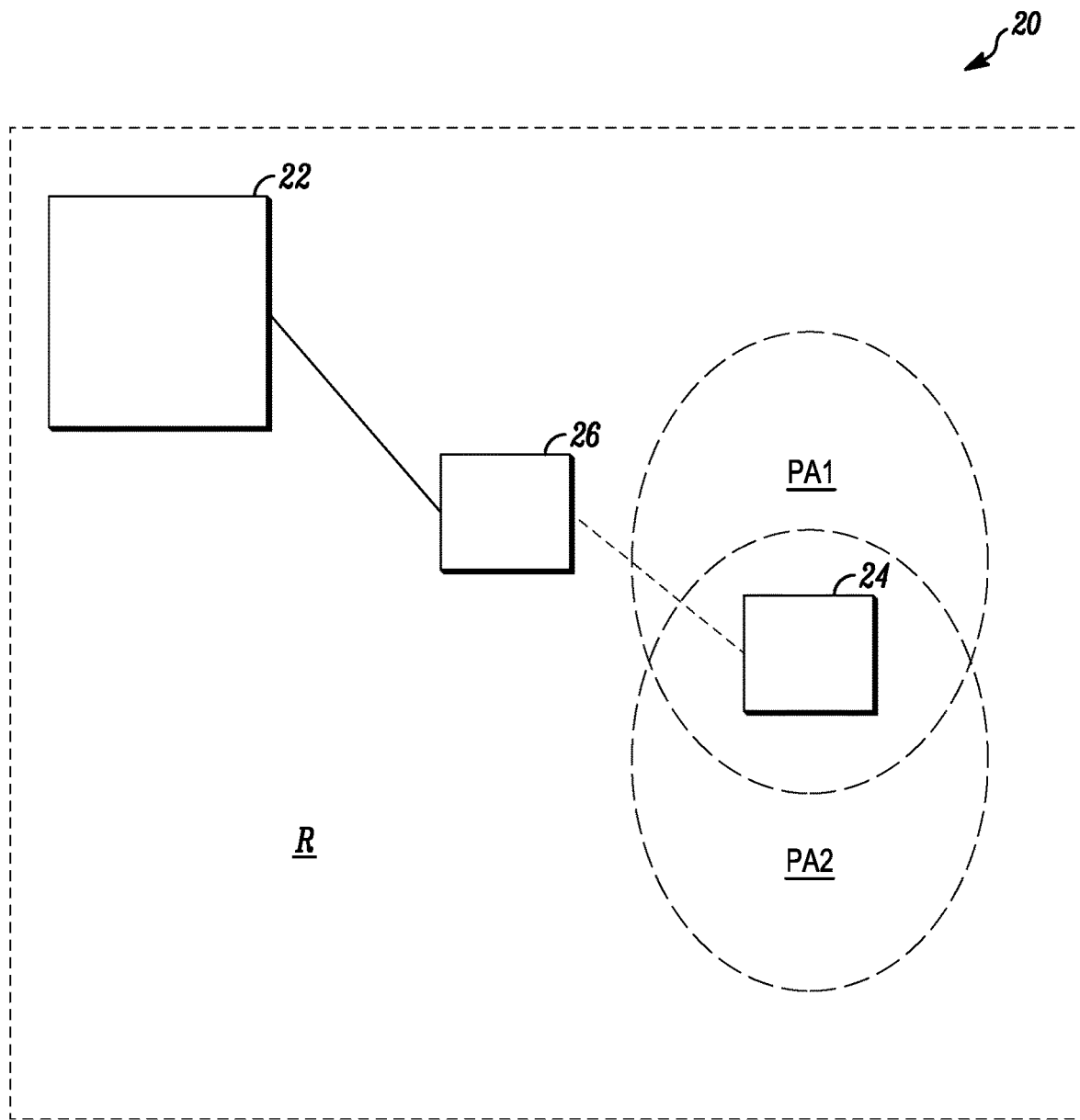
FIG. 1 is a block diagram of a system in accordance with disclosed embodiments.

While this invention is susceptible of an embodiment in many different forms, specific embodiments thereof will be described herein in detail with the understanding that the present disclosure is to be considered as an exemplification of the principles of the invention. It is not intended to limit the invention to the specific illustrated embodiments.

Embodiments disclosed herein can include systems and methods for establishing customized protection areas monitored by a security system and associating specific objects and people with the customized protection areas. For example, such systems and methods can include a control system and a monitoring device coupled to the control system, wherein the monitoring device can monitor a physical entity associated with the security system. In some embodiments, the control system can include a control panel of the security system, a cloud server, and/or a mobile device, and in some embodiments, the monitoring device can include a camera or a location tracker physically associated with the physical entity. Furthermore, in some embodiments, the physical entity can include an inanimate object, such as a bike, a car, a low value item, or a high value item, or a person, such as a user of the security system or a high risk person, such as an elderly person or a child.

According to disclosed embodiments, the control system can receive user input defining a first protection area within a region monitored by the security system, assign the physical entity to the first protection area, receive movement data of the physical entity from the monitoring device, and use the movement data to identify a first pattern of movement of the physical entity with respect to the first protection area. In some embodiments, the region can include a small area, such as a home or an office. However, in some embodiments, the region can include a large area, such as a town or a city. For example, in some embodiments, the physical entity can include a child or children, and the first protection area can include a home, a home nursery, a home playroom, or a home or commercial day care center. Additionally or alternatively, in some embodiments, the physical entity can include a disabled person with cognitive impairment, dementia, or the like in a residential home, a commercial memory care center, or a commercial nursing home.

The first pattern of movement can include a pre-set pattern of movement or a continuously updated pattern of movement. For example, when in a configuration mode, the control system can identify the pre-set pattern of movement by receiving the movement data of the physical entity from the monitoring device for a predetermined number of days or during a predetermined period of time, after which the control system can use such movement data to identify the first pattern of movement. Conversely, the control system can identify the continuously updated pattern of movement by receiving the movement data of the physical entity from the monitoring device until the control system can identify the continuously updated pattern of movement. In these embodiments, the control system can also use the movement data received after the continuously updated pattern of movement is identified to update or refine the continuously updated pattern of movement. Additionally or alternatively, in some embodiments, the control system can use the movement data received after the pre-set pattern of movement or the continuously updated pattern of movement is identified to identify a new pattern of movement of the physical entity with respect to the first protection area, for example, during an alternate period of time (i.e. a weekday pattern of movement vs. a weekend pattern of movement).

In any embodiment, after the first pattern of movement is identified and when the security system is in a security mode, the control system can continue to receive the movement data from the monitoring device, determine whether such movement data deviates from the first pattern of movement identified and, when such movement data deviates from the first pattern of movement identified, initiate an alert. For example, when the physical entity is a child, the control system can determine that the first pattern of movement includes the child entering the first protection area within a time window corresponding to when school lets out. In such embodiments, the control system can determine that the movement data of the child deviates from the first pattern of movement when the child fails to enter the first protection area during the time window and/or leaves the first protection area during the time window and, responsive thereto, can initiate the alert, such as by sending a notification to parents of the child or local authorities.

In some embodiments, when the movement data deviates from the first pattern of movement identified, the control system can identify a type of the physical entity and identify a priority level for the alert based on the type of the physical entity. For example, when the physical entity includes the person and the type of the physical entity includes the high risk person, the control system can identify the priority level of the alert to be high. Conversely, when the physical entity includes the person and the type of the physical entity includes the user of the security system or other persons that are not identified as high risk, the control system can identify the priority level of the alert to be low. Similarly, when the physical entity includes the inanimate object and the type of the physical entity includes the high value item, the control system can identify the priority level of the alert to be high, but when the when the physical entity includes the object and the type of the physical entity includes the low value item, the control system can identify the priority level of the alert to be low.

Additionally or alternatively, in some embodiments, when the movement data deviates from the first pattern of movement identified, the control system can determine an amount by which the movement data deviates from the first pattern of movement identified and identify the priority level for the alert based on the amount by which the movement data deviates from the first pattern of movement identified. For example, the control system can identify the priority level to be high when the amount by which the movement data deviates from the first pattern of movement identified is higher than a predetermined value and to be low when the amount by which the movement data deviates from the first pattern of movement identified is lower than the predetermined value.

In some embodiments, the control system can also receive user input defining a second protection area within the region, assign the physical entity to the second protection area, and use the movement data to identify a second pattern of movement of the physical entity with respect to the second protection area. In some embodiments, the first protection area and the second protection area can overlap. After the second pattern of movement is identified and when the security system is in the security mode, the control system can continue to receive the movement data from the monitoring device, determine whether such movement data deviates from the second pattern of movement identified, and when such movement data deviates from the second pattern of movement identified, initiate the alert.

In some embodiments, the second protection area can include a restricted protection area. In these embodiments, when the security system is in the security mode, the control system can determine whether the movement data indicates that the physical entity has entered the restricted protection area and, when the movement data indicates that the physical entity has entered the restricted protection area, initiate the alert. However, in some embodiments, the restricted protection area can be relevant only to specific types of the physical entity. For example, in these embodiments, when both the movement data indicates that the physical entity has entered the restricted protection area and the type of the physical entity matches a restriction type associated with the restricted protection area, the control system can initiate the alert. Conversely, when the movement data indicates that the physical entity has entered the restricted protection area, but the type of the physical entity fails to match the restriction type associated with the restricted protection area, the control system can refrain from initiating the alert. In some embodiments, the restricted protection area can overlap with other protection areas, and in these embodiments, when the physical entity is in an overlapping region, the control system can prioritize the restricted protection area when determining whether to initiate the alert.

In some embodiments, the control system can identify a security trigger and, responsive thereto, can activate or deactivate the security mode of the security system. Various embodiments of the security trigger are contemplated. For example, the security trigger can include, but is not limited to receiving manual user input activating or deactivating the security mode, identifying a preconfigured time or event corresponding to the security mode being activated or deactivated, and the security system entering a vacation mode.

FIG. 1 is a block diagram of a system 20 in accordance with disclosed embodiments. As seen in FIG. 1, the system 20 can include a control system 22, a physical entity 24, and a monitoring device 26 that monitors movement of the physical entity 24 within a region R that includes a first protection area PA1 and a second protection area PA2.

Figure 2:
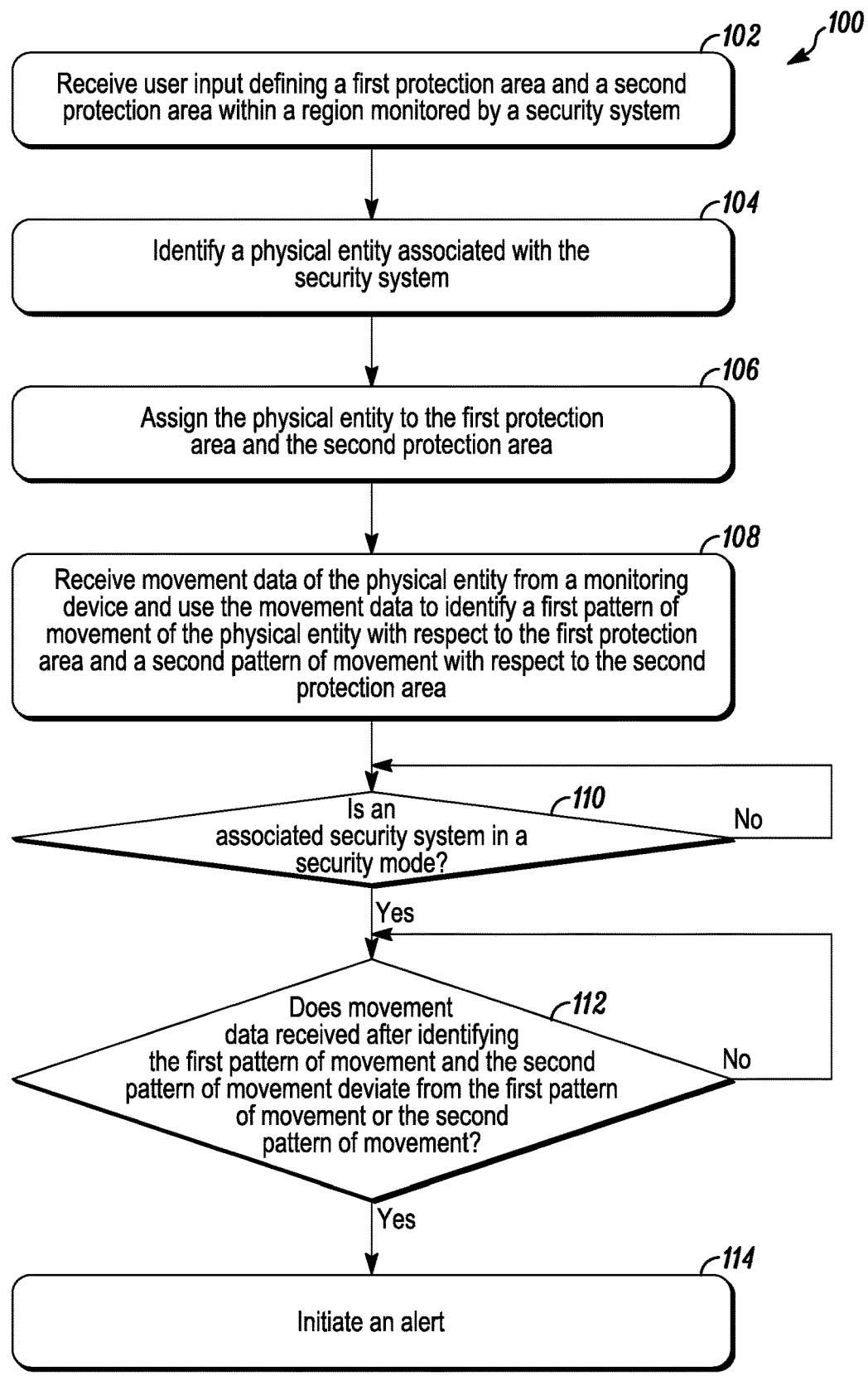
FIG. 2 is flow diagram of a method in accordance with disclosed embodiments.

FIG. 2 is a flow diagram of a method 100 in accordance with disclosed embodiments. As seen in FIG. 2, the method 100 can include the control system 22 receiving user input defining the first protection area PA1 and the second protection area PA2, as in 102, identifying the physical entity 24, as in 104, and assigning the physical entity 24 to the first protection area PA1 and the second protection area PA2, as in 106. Then, the method 100 can include the control system 22 receiving movement data of the physical entity from the monitoring device 26 and using the movement data to identify a first pattern of movement of the physical entity 24 with respect to the first protection area PA1 and a second pattern of movement with respect to the second protection area PA2, as in 108.

After the control system 22 identifies the first pattern of movement and the second pattern of movement as in 108, the method 100 can include the control system 22 continuing to receive the movement data from the monitoring device and determining whether an associated security system is in a security mode, as in 110. When the control system 22 determines that the security system is outside of the security mode, the method 100 can include the control system 22 continuing to determine whether the security system is in the security mode, as in 110. However, after the control system 22 identifies the first pattern of movement and the second pattern of movement as in 108 and determines that the security system is in the security mode as in 110, the method 100 can include the control system 22 determining whether the movement data deviates from the first pattern of movement or the second pattern of movement identified, as in 112. When the control system 22 determines that such movement data fails to deviate from the first pattern of movement and the second pattern of movement identified, the method 100 can include the control system 22 continuing to determining whether such movement data deviates from the first pattern of movement or the second pattern of movement identified, as in 112. However, when the control system 22 determines that such movement data does deviate from the first pattern of movement or the second pattern of movement identified, the method 100 can include the control system 22 initiating an alert, as in 114.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
   receiving first user input defining a first protection area within a region monitored by a security system;
   identifying a physical entity associated with the security system;
   assigning the physical entity to the first protection area;
   receiving movement data of the physical entity from a monitoring device;

using the movement data to identify a first pattern of movement of the physical entity with respect to the first protection area;

after identifying the first pattern of movement, continuing to receive the movement data from the monitoring device;

when the security system is in a security mode, determining whether the movement data received after identifying the first pattern of movement deviates from the first pattern of movement; and when the movement data received after identifying the first pattern of movement deviates from the first pattern of movement, initiating an alert.

2. The method of claim 1 further comprising:

receiving second user input defining a second protection area within the region;

assigning the physical entity to the second protection area;

using the movement data to identify a second pattern of movement of the physical entity with respect to the second protection area;

after identifying the second pattern of movement, continuing to receive the movement data from the monitoring device;

when the security system is in the security mode, determining whether the movement data received after identifying the second pattern of movement deviates from the second pattern of movement; and when the movement data received after identifying the second pattern of movement deviates from the second pattern of movement, initiating the alert.

3. The method of claim 2 wherein the first protection area and the second protection area overlap.

4. The method of claim 1 further comprising:

when the movement data received after identifying the first pattern of movement deviates from the first pattern of movement, identifying a type of the physical entity; and identifying a priority level for the alert based on the type of the physical entity.

5. The method of claim 4 further comprising:

when the physical entity includes a person and the type of the physical entity includes a high risk person, identifying the priority level of the alert to be high.

6. The method of claim 1 further comprising:

when the movement data received after identifying the first pattern of movement deviates from the first pattern of movement, determining an amount by which the movement data received after identifying the first pattern of movement deviates from the first pattern of movement; and identifying a priority level for the alert based on the amount by which the movement data received after identifying the first pattern of movement deviates from the first pattern of movement.

7. The method of claim 1 wherein the physical entity includes one of an inanimate object or a person.

8. The method of claim 1 further comprising:

receiving second user input defining a restricted protection area within the region;

when the security system is in the security mode, determining whether the movement data indicates that the physical entity has entered the restricted protection area; and when the movement data indicates that the physical entity has entered the restricted protection area, initiating the alert.

9. The method of claim 1 further comprising:

receiving second user input defining a restricted protection area within the region;

when the security system is in the security mode, determining whether the movement data indicates that the physical entity has entered the restricted protection area; and when the movement data indicates that the physical entity has entered the restricted protection area and a type of the physical entity matches a restriction type associated with the restricted protection area, initiating the alert.

10. The method of claim 1 further comprising:

identifying a security trigger; and responsive to identifying the security trigger, activating or deactivating the security mode of the security system.

11. A system comprising:

a control system of a security system; and a monitoring device coupled to the control system that monitors a physical entity associated with the security system, wherein the control system receives first user input defining a first protection area within a region monitored by the security system, assigns the physical entity to the first protection area, receives movement data of the physical entity from the monitoring device, and uses the movement data to identify a first pattern of movement of the physical entity with respect to the first protection area, wherein, after identifying the first pattern of movement, the control system continues to receive the movement data from the monitoring device, wherein, when the security system is in a security mode, the control system determines whether the movement data received after identifying the first pattern of movement deviates from the first pattern of movement, and wherein, when the movement data received after identifying the first pattern of movement deviates from the first pattern of movement, the control system initiates an alert.

12. The system of claim 11 wherein the control system receives second user input defining a second protection area within the region, assigns the physical entity to the second protection area, and uses the movement data to identify a second pattern of movement of the physical entity with respect to the second protection area, wherein, after identifying the second pattern of movement, the control system continues to receive the movement data from the monitoring device, wherein, when the security system is in the security mode, the control system determines whether the movement data received after identifying the second pattern of movement deviates from the second pattern of movement, and wherein, when the movement data received after identifying the second pattern of movement deviates from the second pattern of movement, the control system initiates the alert.

13. The system of claim 12 wherein the first protection area and the second protection area overlap.

14. The system of claim 11 wherein, when the movement data received after identifying the first pattern of movement deviates from the first pattern of movement, the control system identifies a type of the physical entity and identifies a priority level for the alert based on the type of the physical entity.

15. The system of claim 14 wherein, when the physical entity includes a person and the type of the physical entity includes a high risk person, the control system identifies the priority level of the alert to be high.

16. The system of claim 11 wherein, when the movement data received after identifying the first pattern of movement deviates from the first pattern of movement, the control system determines an amount by which the movement data received after identifying the first pattern of movement deviates from the first pattern of movement and identifies a priority level for the alert based on the amount by which the movement data received after identifying the first pattern of movement deviates from the first pattern of movement.

17. The system of claim 11 wherein the physical entity includes one of an inanimate object or a person.

18. The system of claim 11 wherein the control system receives second user input defining a restricted protection area within the region, wherein, when the security system is in the security mode, the control system determines whether the movement data indicates that the physical entity has entered the restricted protection area, and wherein, when the movement data indicates that the physical entity has entered the restricted protection area, the control system initiates the alert.

19. The system of claim 11 wherein the control system receives second user input defining a restricted protection area within the region, wherein, when the security system is in the security mode, the control system determines whether the movement data indicates that the physical entity has entered the restricted protection area, and wherein, when the movement data indicates that the physical entity has entered the restricted protection area and a type of the physical entity matches a restriction type associated with the restricted protection area, the control system initiates the alert.

20. The system of claim 11 wherein the control system identifies a security trigger and, responsive thereto, activates or deactivates the security mode of the security system.

\* \* \* \* \*